United States Patent [19]
Anderson

[11] 3,759,588
[45] Sept. 18, 1973

[54] HIGH SPEED HYBRID BEARING COMPRISING A FLUID BEARING & A ROLLING BEARING CONNECTED IN SERIES

[75] Inventor: William J. Anderson, North Olmsted, Ohio

[73] Assignee: The United States of America as represented by the Administrator of the National Aeronautics and Space Administration, Washington, D.C.

[22] Filed: Nov. 12, 1971

[21] Appl. No.: 198,379

[52] U.S. Cl. .................................. 308/35, 308/9
[51] Int. Cl. ...................... F16c 21/00, F16c 39/04
[58] Field of Search ............ 308/35, 9, 160, DIG. 1

[56] References Cited
UNITED STATES PATENTS

| | | |
|---|---|---|
| 3,143,381 | 8/1964 | Vurpillot.............................. 308/9 |
| 1,445,188 | 2/1923 | Wadsworth........................ 308/160 |
| 1,175,415 | 3/1916 | Egbert ................................. 308/35 |
| 2,623,353 | 12/1952 | Gerard................................. 308/35 |
| 3,012,827 | 12/1961 | Goetz................................... 308/35 |
| 3,026,154 | 3/1962 | Marchand........................... 308/35 |

Primary Examiner—Charles J. Myhre
Assistant Examiner—Barry Grossman
Attorney—N. T. Musial et al.

[57] ABSTRACT

A rotating shaft is supported by a fluid bearing and a rolling element bearing coupled in series. Each bearing turns at a fraction of the rotational speed of the shaft. The fluid bearing is preferably conical, thereby providing thrust and radial load support in a single bearing structure.

7 Claims, 3 Drawing Figures

PATENTED SEP 18 1973 3,759,588

INVENTOR
WILLIAM J. ANDERSON
BY Norman T. Musial
Gene E. Shook ATTORNEYS

HIGH SPEED HYBRID BEARING COMPRISING A FLUID BEARING & A ROLLING BEARING CONNECTED IN SERIES

ORIGIN OF THE INVENTION

The invention described herein was made by employees of the United States Government and may be manufactured and used by or for the Government for governmental purposes without payment of any royalties thereon or therefor.

BACKGROUND OF THE INVENTION

1. Field of Invention

The invention is related to bearings, more specifically, to a hybrid bearing in which a rotating shaft is supported by a fluid film bearing and a rolling element bearing coupled in series in a manner that each turns at a fraction of the shaft speed.

2. Description of the Prior Art

Recent developments in gas turbine engines—such as higher thrust-to-weight ratios, advanced compressor design, high temperature materials, and increased power output—have necessitated larger shaft diameters and higher main shaft bearing speeds for future engine designs. For example, bearings in current production aircraft turbine engines operate in the range from 1.5 to 2 million DN (bearing bore in mm times and shaft speed in rpm). However, engine designers anticipate that turbine bearing DN values will have to increase to the range of 2.5 to 3 million in the near future and further developments may require bearing DN values as high as 4 million after 1980.

These higher values create significant wear problems since when ball bearings are operated at DN values above 1.5 million, centrifugal forces increase Hertz stresses at the outer-race ball contacts and seriously shorten bearing fatigue life. At typical aircraft thrust loads carried by bearings, such as 2,000 and 4,000 pounds, an increase from a DN of 1.8 million to 4.2 million results in a reduction in life of 98 and 96 percent, respectively.

Many attempts have been made to reduce the centrifugal forces and thus increase the life of high speed bearings. One method of accomplishing this result is to decrease the mass of the rolling elements by using hollow or drilled elements. The technique has resulted in improving fatigue life by a factor of 2.5 at a DN of 3 million and thrust load of 4,000 pounds.

A second technique for diminishing centrifugal forces utilizes hybrid bearings to eliminate the use of rolling bearings at high speeds. These bearings generally contain a rolling element bearing and a fluid bearing. The former is used for starting, stopping and low speed operation when centrifugal forces are minimal. The latter operates only at high speeds. Various devices are used to achieve this alternate operation. A clutch activates a fluid bearing in Banerian U.S. Pat. Nos. 2,986,430 and 3,058,786. Centrifugal force disengages ball bearings in Hiatt et al. U.S. Pat. No. 3,360,310 and Marchand U.S. Pat. No. 3,026,154. Goetz U.S. Pat. No. 3,012,827 illustrates the use of ball bearings to support a rotating shaft before a gas bearing begins its support function.

The prior art hybrid bearing significantly increases bearing life since the rolling element bearing ceases to operate at the higher shaft speeds when the entire rotational load is supported by the fluid bearing. A disadvantage of hybrid bearings of this design is their large power losses compared with conventional ball bearing which results from the relative inefficiency of the fluid bearing. High power loss makes them unsuitable for some applications.

McNaughton et al. U.S. Pat. No. 2,872,254 discloses a device similar in operation to these hybrid bearings. However, in contrast to the other prior art devices which are concerned with high speed bearing applications, McNaughton's device is useful to achieve operation over a wide temperature range. This hybrid includes a ball bearing element packed with a lubricant having a high viscosity at room temperature and a sliding element. Heat generated by the sliding element, which initially supports the shaft, decreases the viscosity of the ball bearing lubricant and causes the sliding element to lock, thus transferring the rotation to the ball bearings. If the sliding element does not rigidly lock, some speed sharing between the bearings occurs; however, it is minimal, uncontrolled and unpredictable.

Composite bearings in which the load is shared by the various bearing elements connected in parallel are also known. In this arrangement each of the bearing elements turns at the shaft speed. Some increase of bearing life is attained through load sharing, but at high DN values. This is less than that attained through speed sharing. Examples of parallel composites are disclosed in U.S. Pat. Nos. 2,875,001; 3,065,036; 3,301,611 and 3,305,280.

SUMMARY OF INVENTION

An object of this invention is therefore to provide a bearing containing a rolling element in which fatigue life is substantially increased while maintaining a level of power loss no greater than that of an equivalent conventional rolling element bearing.

A second object of this invention is to reduce the stresses on the outer race contacts of a rolling element bearing caused by centrifugal forces generated at high shaft speeds.

Another object of this invention is to provide a composite bearing in which each bearing rotates at a fraction of the shaft speed.

A further object of this invention is to provide a composite bearing composed of a fluid film bearing and a rolling element bearing connected in a manner that the inner race of the latter bearing rotates at less than the shaft speed.

A still further object of this invention is to provide a composite bearing which will support both radial and thrust loads.

These and other objects are accomplished by providing a composite bearing which comprises a fluid film bearing and a rolling element bearing connected in series in a manner which reduces the orbital speed of the rolling element by decreasing the speed of the inner race of the rolling element bearing to a fraction of the shaft rate. This is accomplished by connecting the first element of the fluid film bearing to a shaft and the second element to the inner race of the rolling element bearing in a manner that the latter two elements rotate at the same speed. The outer race of the rolling element bearing is mounted on a stationary housing. In the context of this application the inner race is defined as the one attached to the fluid bearing element; the outer race as the one attached to a stationary support. In operation the first element turns at the full shaft speed and the second element and the inner race rotate at a slower rate.

Since the DN value is a function of bearing bore and shaft speed, it is clear that its value is not decreased by the hybrid bearing of this invention. However, it is equally clear that the fatigue life of the bearing will be increased because the speed of the rolling element in this bearing is less than the speed of the rolling element in a conventional roller bearing at a given DN. The benefits of the invention are illustrated by comparing fatigue life improvement obtained with a hybrid bearing using a ball bearing, assuming a 30 percent reduction in roller element speed, with that of hollow ball bearings. At a 4,000 pound thrust and DN values of 3 and 4 million bearing life should theoretically improve by a factor of 3.2 and 5.7, respectively, over that of conventional bearings using solid balls. In contrast under the same conditions fatigue life using hollow balls was improved only by a factor of 2.5 and 4.2. The theoretical values for the bearings of this invention were obtained by comparing fatigue life values for solid ball bearing with those obtained at a DN of 30 percent less.

DESCRIPTION OF THE PREFERRED EMBODIMENTS

Figure 1:
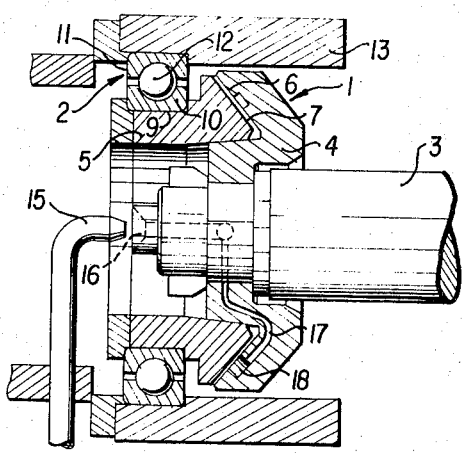
FIG. 1 illustrates a cross section of the composite bearing of this invention.

FIG. 1 illustrates the subject invention which comprises a fluid film bearing 1 and a rolling element bearing 2 connected in series journaled to a rotating shaft 3. The fluid bearing is of the conventional type and, comprises first and second elements 4 and 5 containing first and second opposed surfaces, 6 and 7, respectively. As in conventional fluid bearings sufficient clearance is provided between the surfaces to permit the second surface to float and slide freely on a fluid film maintained between said first and second surfaces. The surfaces may be parallel or perpendicular to the axis of the journaled shaft. In the former configuration the bearing will support only radial loads; only thrust loads will be supported in the latter case. Alternatively, the bearing may have four surfaces, two aligned parallel to the axis and two perpendicular, thus supporting axial and thrust loads. This dual support function can also be accomplished in the preferred arrangement shown in FIG. 1 wherein the two bearing surfaces are conical in shape having their apex at the shaft axis.

The first bearing element has a central hole for journaling. The second contains a means for mounting the inner race of the rolling element bearing. In FIG. 1, this means is shown as a groove 9.

Figure 2:
FIG. 2 is a cross section of the antifriction element of the subject invention wherein the rolling element is a combination roller and ball bearing.

The rolling element bearing is composed of a first and second race, 10 and 11, respectively, having a plurality of rolling elements 12 between them. In FIG. 1, the rolling element is shown as a ball bearing, however, any conventional roller or ball and roller combination bearing can also be used. In FIG. 2, a combination roller element bearing containing ball and roller elements 13 and 14, respectively, is shown. The inner race 10 of the roller bearing is mounted in the groove 9 contained on the second element of the fluid bearing. The outer race 11 is mounted on a stationary housing 13.

The fluid bearing may be lubricated by any conventional means. In the device illustrated in FIG. 1 a jet 15 guides oil into an opening 16 in the shaft 3. The oil flows through a canal 17 to a lubricant supply orifice 18 and then flows between the bearing elements. Centrifugal forces generated by the rotation of the shaft pumps the oil to the bearings. Alternatively, the fluid bearing can be lubricated independently of the rotation of the shaft.

A rotating shaft which is journaled in the hybrid bearing of the present invention is initially supported only by the rolling bearing. That is, the inner race of the rolling bearing rotates at the full shaft speed. As shaft speed increases, sufficient lubricant pressure is built up to start the fluid bearing rotating. At this point the inner race speed drops abruptly, indicating that the fluid bearing is now rotating at a portion of the shaft speed. The inner race and the second fluid bearing element are then rotating at the same rate which is less than the shaft speed.

Figure 3:
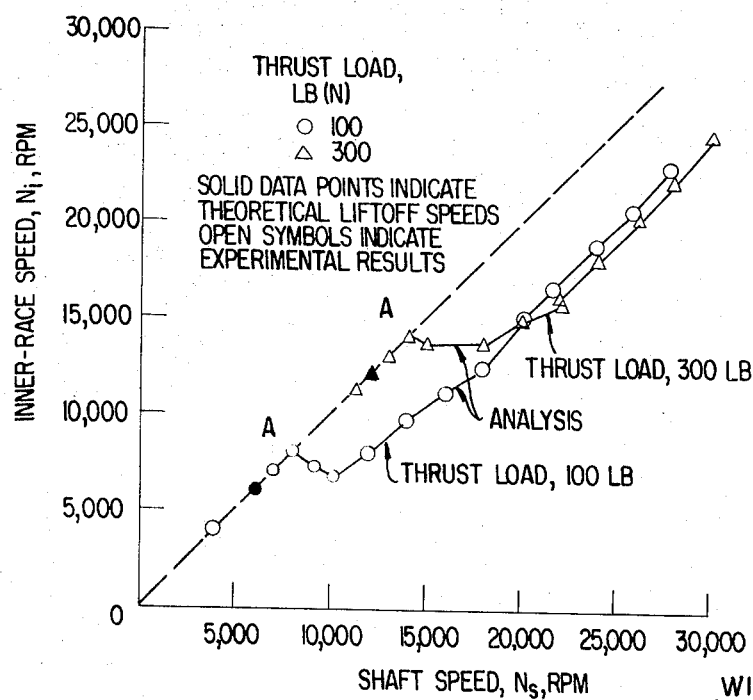
FIG. 3 graphically illustrates the speed sharing characteristics of the present invention.

FIG. 3 graphically illustrates the operation of the subject invention under 100 and 300 pound thrust loads, where point A designates the lift off of the fluid bearing. In the figure the dashed line illustrates that in a conventional ball bearing the inner race speed is the same as the shaft speed. It can be seen that at low shaft speeds the hybrid bearing of this invention operates similarly to the conventional bearing. (Of course this is not true if the fluid bearing is pressurized.) However, when sufficient shaft speed is attained the fluid bearing lifts off and the inner race speed drops. Note that the liftoff speed is higher for the 300 pound load since higher fluid pressures are necessary to float the fluid bearing. It is clear from these curves that the inner race speed of the ball bearing of the hybrid bearing is less than those in conventional ball bearings for the same shaft speed. This decrease results in significant increases in bearing fatigue life.

I claim:

1. A hybrid bearing comprising a fluid film bearing comprising first and second elements first and second substantially parallel and opposed surfaces on said first and second elements respectively, and a rolling element bearing including an inner and an outer race, one of said races being mounted on said second element whereby said rolling element bearing is connected in series with said fluid bearing so that said second element rotates at a fraction of the speed of said first element when the driving torque through said fluid film bearing equals the restraining torque of said rolling element bearing.

2. A hybrid bearing according to claim 1, wherein said fluid film bearing surfaces support both radial and axial loads.

3. A hybrid bearing according to claim 2, wherein said fluid film bearing surfaces are conical in shape.

4. A hybrid bearing according to claim 1, wherein said rolling element bearing is a ball bearing.

5. A hybrid bearing according to claim 1, wherein said rolling element bearing is a combination ball and roller bearing.

6. A hybrid bearing comprising a rotatable first element having a first smooth surface thereon, a second element having a second smooth surface aligned in a substantially parallel and opposed relationship with said first smooth surface, means for forming a fluid film between said first and second surfaces, an inner race secured to said second element remote from said second surface, a fixedly mounted outer race surrounding said inner race in spaced relationship, and a plurality of rolling elements interposed between said inner and outer races so that when the driving torque through the fluid film equals the restraining torque of said rolling elements the second element rotates at a constant speed which is less than the rotational speed of said first element.

7. A hybrid bearing according to claim 6, wherein said substantially parallel opposed surfaces are conical in shape having their apices at the axis of rotation of said bearing.

* * * * *